United States Patent [19]

Clark

[11] 4,181,653

[45] Jan. 1, 1980

[54] DISPERSE DYES FROM 2-HALO-4,6-DINITROANILINE AND 2(2'-ALKOXY-5'-ALKANOYLAMINOANILINO)ALKANES

[75] Inventor: Gary T. Clark, Kingsport, Tenn.

[73] Assignee: Eastman Kodak Company, Rochester, N.Y.

[21] Appl. No.: 839,530

[22] Filed: Oct. 5, 1977

[51] Int. Cl.$^2$ ............................................. C09B 29/26
[52] U.S. Cl. ................................................. 260/207
[58] Field of Search ............................. 260/207, 207.1

[56] References Cited

U.S. PATENT DOCUMENTS

| | | | |
|---|---|---|---|
| 2,155,755 | 4/1939 | Felix et al. | 260/207 |
| 2,469,682 | 5/1949 | Dickey | 260/207 X |
| 3,250,763 | 5/1966 | Gies et al. | 260/207 |
| 3,692,769 | 9/1972 | Weaver et al. | 260/207 X |

*Primary Examiner*—Charles F. Warren
*Attorney, Agent, or Firm*—Donald W. Spurrell; Daniel B. Reece, III

[57] ABSTRACT

Disclosed are disperse dyes comprising a chloro- or bromodinitroaniline azo moiety and a particular group of 2(2'-alkoxy-5'-alkanoylaminoanilino)alkane couplers. These dyes give exceptional color depth and brightness, shade permanency on heat setting, build, leveling, barre coverage, dye exhaustion and dyeing rate on fibers of polyester, cellulose acetate, cellulose triacetate, and polyamide (nylon) over widely varying dyeing conditions of, for example, temperature and pressure. The dyes exhibit blue shades with excellent colorfastness properties on polyester fibers and have excellent dyeability by heat fixation (Thermosol) or exhaust (boil and pressure) methods of application on this substrate. Uniform dyeability under a wide variety of conditions is an exceptional feature of the present dyes.

7 Claims, No Drawings

DISPERSE DYES FROM 2-HALO-4,6-DINITROANILINE AND 2(2'-ALKOXY-5'-ALKANOYLAMINOANILINO)ALKANES

The present invention concerns disperse dyes comprising a chloro- or bromodinitroaniline azo moiety and a particular group of 2(2'-alkoxy-5'-alkanoylaminoanilino)alkane couplers. These dyes give exceptional color depth and brightness, shade permanency on heat setting, build, leveling, barré coverage, dye exhaustion and dyeing rate on polyester fiber over widely diverse dyeing conditions such as temperature, pressure and dye carrier concentrations. The dyes exhibit blue shades with excellent colorfastness properties on fibers of polyester, cellulose acetate, cellulose triacetate, and polyamide (nylon), and have excellent dyeability by heat fixation or exhaust at boil and pressure on this substrate. Uniform, level and reproducible dyeability under a wide variety of conditions is a particularly exceptional feature of the present dyes. In addition to the above, the present dyes exhibit excellent fastness to light, crocking, wash, sublimation, gas, acid and alkaline perspiration and pH stability.

The dyes of this invention are represented by the following general structure

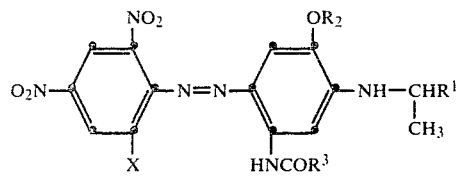

wherein X is bromo or chloro, $R_1$ is straight or branched chain alkyl of 2-10 carbons, and $R_2$ and $R_3$ are each selected from straight or branched alkyl of 1-4 carbons, such as methyl, ethyl, propyl, butyl, and tertiary butyl.

Polyester fibers are difficult to dye with many disperse dyes at both the boil and under pressure. For dyeing at the boil (atmospheric-212° F.) it is necessary to complicate the process by the addition of chemical auxiliaries (carriers) to the dyebath to increase the rate of dyeing and color yield. Pressure dyeing at 220°-275° F. and thermal fixation at, for example, 400° F. circumvent the use of carriers; however, unless process parameters are strictly controlled, poor shade reproducibility is obtained with most disperse dyes. In contrast, even without close control of application parameters, the dyes of this invention give excellent shade reproducibility, excellent build-up, color yield, exhaustion of dye onto the fiber, dyeing rate, leveling (migration) and barré coverage on polyester fabrics by all of the various dyeing procedures. These dyes also have excellent light, wash, crock, gas, acid or basic perspiration, and sublimation fastness on the above substrate. The dyes exhibit excellent pH stability over a range of 4–8 when applied to polyester above the boil (220°–275° F.). The build-up characteristics or color yield, exhaustion of dye onto the fiber, and rate of dyeing of these dyes are superior to dyes with almost identical chemical structure. The good reproducibility of these dyes is reflected in their leveling (migration) and barré coverage abilities on polyester fabrics. From the above properties these dyes have excellent shade reproducibility by all methods of application (boil, pressure, heat fixation) on polyester fibers.

Preparation of Coupler—The couplers of this invention can be prepared from either 2-methoxy-5-acetamidoaniline or 2-nitro-4-acetamidoanisole and the methyl alkyl ketone with hydrogen and a catalyst. The preparation for 2-(2'-methoxy-5'-acetamidoanilino)hexane is as follows. A mixture of 18.0 g. (0.1 mole) of 2-methoxy-6-acetamidoaniline, 100 ml. of ethanol, 25.0 g. (0.2 mole) methyl n-butyl ketone, and 3.0 g. of 5% Pt/carbon is treated at 165° C. and 1000 psi. of hydrogen until the uptake of hydrogen ceases. The solvent and catalysts are removed. Hexane is added and the solid product is collected by filtration (21.0 g.—80% yield). NMR spectroscopy supports the proposed structure.

Dyes—The dyes of this invention shown below are prepared by diazotization of 2-bromo or chloro-4,6-dinitroaniline and coupling with one of the above couplers.

EXAMPLE 1

A. Diazotization

To a solution of nitrosylsulfuric acid obtained from reacting $NaNO_2$ (18.0 g.) and $H_2SO_4$ (125 ml.) is added 1-5 acid (100 ml. of 1 part propionic acid and 5 parts acetic) below 20° C. The system is cooled to 0°-5° C. and 65.5 grams (0.25 mole) of 2-bromo-4,6-dinitroaniline dissolved in 200 ml. of $H_2SO_4$ is added dropwise below 5° C. The reaction is allowed to stir at 0°-5° C. for two hours to complete diazotization.

B. Coupling

To a solution of 26.4 grams (0.1 mole) of 2-(2'-methoxy-5'-acetamidoanilino)hexane in 75 ml. of 1-5 acid is added 250 ml. (0.1 mole) of the above diazo solution with stirring and below 20° C. The reaction is allowed to stand for one hour, poured into 800 ml. of water, collected by filtration, washed with water, and air-dried to yield 53.7 grams (98%) of the following dye.

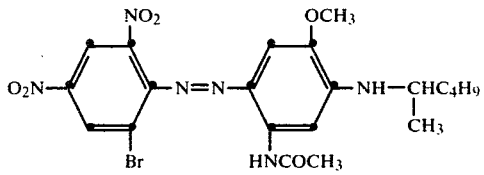

TABLE 1

| Example | X | $R_1$ | $R_2$ | $R_3$ |
|---|---|---|---|---|
| 2 | Cl | $C_4H_9$ | $CH_3$ | $CH_3$ |
| 3 | Br | $C_2H_5$ | $CH_3$ | $CH_3$ |
| 4 | Cl | $C_2H_5$ | $CH_3$ | $CH_3$ |
| 5 | Br | $CH_2-CH(CH_3)_2$ | $CH_3$ | $CH_3$ |
| 6 | Br | $C_2H_4CH(CH_3)_2$ | $CH_3$ | $CH_3$ |
| 7 | Br | $C_2H_4-CHC_3H_7$ $\vert$ $CH_3$ | $CH_3$ | $CH_3$ |
| 8 | Br | $C_6H_{13}$ | $CH_3$ | $CH_3$ |
| 9 | Br | $C_8H_{17}$ | $CH_3$ | $CH_3$ |
| 10 | Cl | $C_{10}H_{21}$ | $CH_3$ | $CH_3$ |

TABLE 1-continued

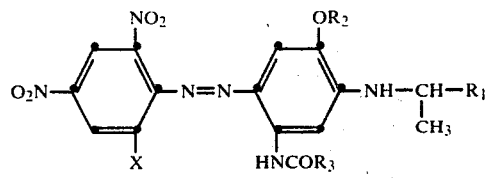

| Example | X  | $R_1$            | $R_2$    | $R_3$    |
|---------|----|------------------|----------|----------|
| 11      | Br | $C_4H_9$         | $C_2H_5$ | $C_2H_5$ |
| 12      | Br | $C_2H_5$         | $C_2H_5$ | $C_4H_9$ |
| 13      | Cl | $CH-(CH_3)_2$    | $CH_3$   | $CH_3$   |
| 14      | Cl | $CH_2CH(CH_3)_2$ | $C_2H_5$ | $C_3H_7$ |
| 15      | Cl | $C_2H_4CH(CH_3)_2$ | $CH_3$ | $C_2H_5$ |

Although the invention has been described in considerable detail with particular reference to certain preferred embodiments thereof, variations and modifications can be effected within the spirit and scope of the invention.

I claim:

1. A compound of the formula

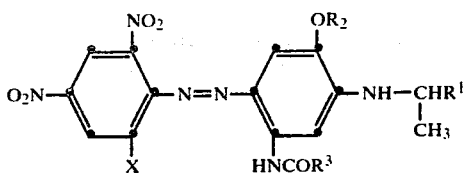

wherein X is bromo or chloro, $R_1$ is straight or branched chain alkyl of 2–10 carbons, and $R_2$ and $R_3$ are each selected from straight or branched alkyl of 1–4 carbons.

2. The compound of claim 1 wherein $R_1$ is $-C_4H_9$.

3. The compound of claim 2 wherein $R_2$ and $R_3$ are both $-CH_3$.

4. The compound of claim 1 wherein $R_1$ is

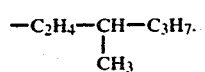

5. The compound of claim 1 wherein $R_1$ is $-C_6H_{13}$.
6. The compound of claim 1 wherein $R_1$ is $-C_8H_{17}$.
7. The compound of claim 1 wherein $R_1$ is $-C_{10}H_{21}$.

* * * * *